United States Patent
Tribken et al.

[15] 3,671,904
[45] June 20, 1972

| [54] | PICK-OFF | | |
|---|---|---|---|
| [72] | Inventors: | Everett R. Tribken, Scottsdale, Ariz.; Frederic L. Miller, San Diego, Calif. | |
| [73] | Assignee: | The United States of America as represented by the Secretary of the Navy | |
| [22] | Filed: | Jan. 22, 1971 | |
| [21] | Appl. No.: | 109,027 | |

Related U.S. Application Data

[63] Continuation of Ser. No. 795,769, Jan. 16, 1969, abandoned.

[52] U.S. Cl..............................336/132, 336/134, 336/135
[51] Int. Cl.........................................................H01f 21/06
[58] Field of Search................336/130, 132, 133, 134, 135, 336/30

[56] References Cited

UNITED STATES PATENTS

| 1,414,248 | 4/1922 | Armor | 336/134 X |
| 2,558,184 | 6/1951 | Lauet | 336/133 |
| 2,990,527 | 6/1961 | Brown et al. | 336/135 X |
| 3,001,127 | 9/1961 | Pitches et al. | 336/135 X |
| 1,964,265 | 6/1934 | Markley | 336/135 X |
| 2,488,734 | 11/1949 | Mueller | 336/135 |
| 3,128,441 | 4/1964 | Johnson et al. | 336/30 |
| 3,214,717 | 10/1965 | Brodersen | 336/135 |
| 3,351,850 | 11/1967 | Crawford et al. | 336/134 X |
| 3,404,359 | 10/1968 | Kawada | 336/135 |

*Primary Examiner*—Thomas J. Kozma
*Attorney*—Edgar J. Brower, Arthur L. Branning, Thomas O. Watson, Jr. and R. R. Anderson

[57] ABSTRACT

An electrical pick-off for measuring small quantities of angular rotation. An exciting coil energizes a core having two pairs of poles, spaced relatively close together. An output coil is located between the poles and has a low magnetic reluctance core arranged to move within the coil although the coil is fixed with respect to the pole pieces.

5 Claims, 3 Drawing Figures

PATENTED JUN 20 1972 3,671,904

INVENTORS
EVERETT R. TRIBKEN
FREDERIC L. MILLER

BY
ATTORNEY

AGENT

PICK-OFF

CROSS-REFERENCE TO RELATED APPLICATION

This application is a continuation of application, Ser. No. 795,769, now abandoned, filed 16 Jan. 1969 for Pick-Off.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to an electromagnetic pick-off and, more particularly, to an electromagnetic pick-off which is not only fail passive but one that has the advantage that it can achieve full coupling from one direction to the other with only a very few degrees of rotation, while exhibiting an extremely high degree of sensitivity.

2. Description of the Prior Art

Devices of the type described currently find wide application in conjunction with accelerometers, rate gyroscopes and electromechanical gaging devices. The dynamic requirements of systems which use gyroscopes and accelerometers have resulted in the development of devices having stiffer centering springs and greatly reduced angular deflection. The increased sensitivity requirements of associated measuring devices necessary to compensate for such reduced angular deflection has not been satisfactorily met by any induction type pick-off known in the prior art. Low sensitivity is an inherent characteristic of the conventional inductance-type pick-off wherein a maximum angular displacement is required to produce an effective pick-off output voltage.

Because electrical signals can be magnified electronically, it is advantageous in many instances to translate the position or displacement of a movable element into an electrical signal which, after amplification, can be used to operate an indicator, recorder, control system, or the like.

A large variety of such devices for translating physical displacement into electrical signals have been heretofore proposed. However, certain undesirable characteristics inherent in the prior devices have limited their use. For example, some position responsive devices are not sufficiently sensitive to permit precise measurements, some have unstable or non-linear response characteristics which may be of such nature that correction or compensation is difficult or impossible, and many such devices deliver only feeble electrical quantities so that compensation circuits, which waste part of this measuring signal in order to compensate for the characteristic of the measuring device or other parts of the system, cannot be employed. These and other defects or shortcomings of such sensing devices must be considered carefully in selecting the type of device to be used for a particular application.

Accordingly, an object of the present invention is to provide an electromagnetic pick-off having a high degree of sensitivity and accuracy.

Another object of the present invention is the provision of the pick-off which is fail passive for shorted and opened windings.

Another object of the present invention is the provision of the pick-off which can achieve full coupling from one direction to the other with only a few degrees of rotation.

Still another object of the present invention is the provision of the pick-off which is particularly adaptable to the requirements of a rate gyro requiring high sensitivity.

Yet another object of the present invention is the provision of a pick-off using one excitation and one output coil for bi-directional control.

Still another object of the present invention is the provision of an electromagnetic pick-off which varies the flux coupling between coils by the movement of a low reluctance magnetic element rather than by changing coil orientation.

Other objects and many of the attendant advantages of the present invention will readily become apparent as the same becomes better understood by reference to the following detailed description when considered in connection with the accompanying drawings in which like reference numerals designate like parts throughout the figures thereof.

BRIEF DESCRIPTION OF PREFERRED EMBODIMENTS

Figure 1:
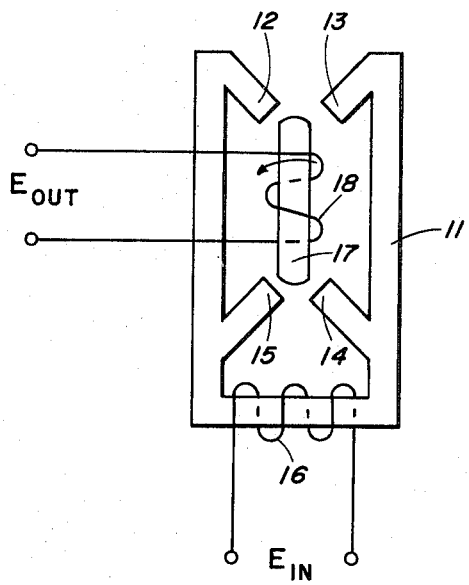
FIG. 1 shows a diagrammatic view of the invention when used to pick-off rotary motion.

Referring now to the drawings, in FIG. 1, there is shown a pole piece 11 which is substantially rectangular in form, but having one end severed at its middle with the two halves bent inwardly to form diagonally extending ears 12 and 13. At the opposite end of pole piece 11 from ears 12 and 13, and positioned somewhat from the complete extremity of the rectangle, there are placed two other short diagonal ears, or projections, 14 and 15 which are designed to operate with ears 12 and 13 to form corresponding magnetic poles. Pole piece 11 may be formed of a plurality of magnetic sheets, or laminations, stacked and bound together, and is made of a highly magnetizable material, as is well known in the art. Wrapped around the unsevered end of the magnetic pole piece 11 there is a coil 16 for carrying an alternating current exciting potential, the number of turns in coil 16 being determined by the design of the equipment in which the pick-off is being used.

Positioned at the center of the ears 12, 13, 14, and 15 there is located a low reluctance magnetic element 17 mounted for rotation between the ear pieces. Appropriately designed linkage, not shown, connects magnetic element 17 with the accelerometer or gyroscope whose movement it is intended to measure. Wound around the magnetic element 17 is an output coil 18 which produces an output potential indicative of the amount of rotary motion of element 17 as will be shown hereinafter. Output coil 18 while surrounding low reluctance magnetic element 17 is not wound tight enough around element 17 so as to be integral with it, but instead there is sufficient space between the two to allow reluctance element 17 to move within the coil 18 without causing 18 itself to move.

It should be noted that the structure of the present invention, wherein the low reluctance magnetic element 17 is permitted to move and therefore record a rotary motion without the necessity of changing the orientation of output coil 18 results in a fail passive system. The advantages and novel features of fail passive systems will be discussed hereinafter.

Figure 2:
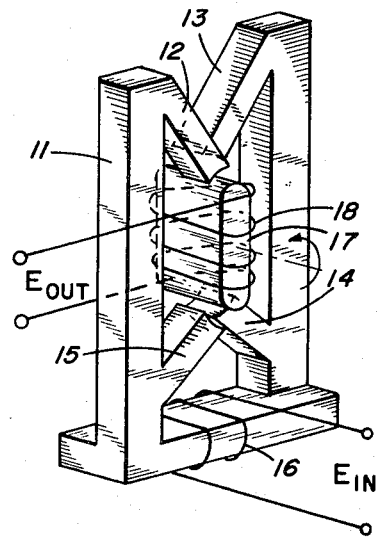
FIG. 2 shows a more detailed view of the pole pieces.

In the detailed view of FIG. 2, there is a further showing of the structure of magnetic pole piece 11. It should be noted that the ears 12 and 13 can be offset slightly from each other (i.e., into and out of the paper as shown in FIG. 1) so as to avoid magnetic shorting. Thus, for the rotary pick-off, poles 12 and 14, and 13 and 15 can have a larger physical distance between them than as illustrated by a planar drawing. It should also be noted that this additional distance allows the output coil 18 to be fixed with sufficient clearance to allow the magnetic element 17 to move within it.

Figure 3:
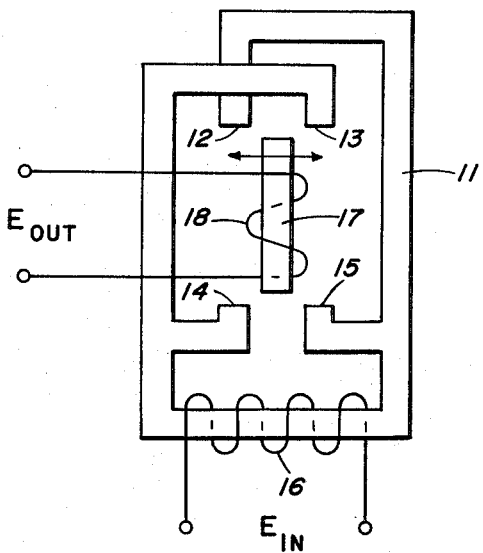
FIG. 3 shows a diagrammatic view of a modification of the invention for the pick-off of linear motion.

Turning now to FIG. 3, there is shown a modification of the invention which may be used to record linear motion. In this situation it can be seen that the ears, or projections, 12, 13, 14 and 15, rather than being set at a diagonal angle as in the previous illustration, are now positioned directly opposite one another. Also, the projections 12 and 13 are again offset from each other and in the illustration of FIG. 3 projection 13 is shown as being positioned in front of projection 12. Furthermore, in this embodiment low reluctance magnetic element 17, rather than being pivoted in its middle for rotary motion, is constructed to be moved by appropriate linkages linearly transversely across the magnetic gaps caused by 12, 14 and 13, 15.

In operation, the coupling between the exciting coil 16 and the output coil 18 is varied by orienting the low reluctance magnetic element 17 in a position 12–14 or 13–15. In changing from 12–14 to 13–15 the direction of the coupling will reverse.

A fail passive, or fail safe control, by its definition, is a control system so designed that control circuit failure cannot cause a dangerous condition under any circumstances, or in other words, a failure will cause a zero or lower gradient output rather than a hard-over or steady-state output as in a dead short circuit. A novel feature of the present invention is that the pick-off is fail passive for both shorted and open windings. The full fail passive nature of the device does assume that the magnetic structure (iron) does not fail, and that the input and output circuit should generally be isolated from each other in terms of ground so that a short circuit to the iron cannot cause an output. The rotary pick-off of FIG. 1 is similar to a two-wire synchro in terms of its fail passive features, but does have the advantage that it can achieve full coupling from one direction to the other with only a few degrees of rotation, whereas the two wire synchro requires a 180° rotation from the same result. Thus, it is more adaptable to requirements such as a rate gyro pick-off which requires this type of sensitivity. There is no previous equivalent to the linear pick-off of FIG. 3 in a device using one excitation and one output coil for a bi-directional control.

From the above description of the structure and operation of the present invention, it is clear that there is disclosed an electromagnetic pick-off which is fail passive, which exhibits high sensitivity, and one which will produce full coupling from one direction to the other with only a very few degrees of movement of the low reluctance magnetic element. The invention offers considerable improvement over prior art pick-offs wherein there are commonly two ways of achieving similar types of pick-offs (but not fail passive) and which do not use sliding contacts. One type varies the coupling (magnitude but not direction) between either one excitation and two output coils, or between two excitations and one output coil. In either case, they depend upon the opposing action of the coupling to achieve a null, and thus coil failures can provide steady-state or hard-over output. Another type of device varies the impedance of an element and combines this in a bridge circuit to achieve plus or minus outputs, but, here again, a failure of one of the elements will introduce a steady-state or hard-over output.

Obviously many modifications and variations of the present invention are possible in light of the above teachings. It is therefore to be understood that within the scope of the appended claims the invention may be practiced otherwise than as specifically described.

We claim:

1. Apparatus for measuring physical displacements comprising:
    a rectangular pole piece for ferromagnetic material, one of the short sides having a gap therein, the two long sides being offset from each other in the direction which is perpendicular to the plane of the rectangle;
    a pair of projections of ferromagnetic material extending inwardly from the long sides of the pole piece, each projection being disposed the same distance from the short sides;
    a coil of wire wound around the other short side of the pole piece;
    magnetic means mounted for movement between the projections and the gaped side of the pole piece; and,
    a stationary coil disposed between the projections and the gaped side of the pole piece and substantially surrounding the magnetic means.

2. The apparatus of claim 1 wherein the magnetic means is mounted for rotary movement.

3. The apparatus of claim 2 wherein the axis of the stationary coil is parallel to the long sides of the pole piece and the magnetic means is mounted for rotation about said axis.

4. The apparatus of claim 1 wherein the magnetic means is mounted for linear movement.

5. The apparatus of claim 4 wherein the axis of the stationary coil is parallel to the long sides of the pole piece and the magnetic means is mounted for linear movement in a direction perpendicular to said axis.

* * * * *